United States Patent
Kavipurapu (10) Patent No.: US 6,504,786 B1
(45) Date of Patent: Jan. 7, 2003

(54) HIGH SPEED, SCALABLE, DYNAMIC INTEGRATED PROGRAMMABLE SWITCH (DIPS) DEVICE

(76) Inventor: Gautam Nag Kavipurapu, 7750 N. MacArthus, Irving, TX (US) 75063

( * ) Notice: Subject to any disclaimer, the term of this patent is extended or adjusted under 35 U.S.C. 154(b) by 0 days.

(21) Appl. No.: 09/707,606

(22) Filed: Nov. 7, 2000

(51) Int. Cl.[7] .................................................. G11C 8/00
(52) U.S. Cl. .................. 365/230.05; 365/154; 365/195; 370/376
(58) Field of Search ......................... 365/195, 230.05, 365/189.04, 149, 156, 154; 370/376, 395

(56) References Cited

U.S. PATENT DOCUMENTS

| | | | |
|---|---|---|---|
| 5,381,406 A | * 1/1995 | Yamashita | 370/376 |
| 5,473,574 A | * 12/1995 | Clemen et al. | 365/230.05 |
| 5,838,681 A | * 11/1998 | Bonomi et al. | 370/395 |
| 5,912,850 A | * 6/1999 | Wood et al. | 365/201 |
| 6,011,793 A | * 1/2000 | Smith | 370/363 |

* cited by examiner

Primary Examiner—David Nelms
Assistant Examiner—Gene N. Auduong
(74) Attorney, Agent, or Firm—James J. Murphy, Esq.; Winstead Sechrest & Minick, P.C.

(57) ABSTRACT

An asymmetrical switching element including a random access memory element, a first port selectively coupled to the memory element by first control signal and a plurality of second ports, each independently coupled to the memory element by corresponding one of a plurality of second control signals.

11 Claims, 10 Drawing Sheets

FIG. 1

| APPLICATION |
|---|
| PROVIDES ACCESS TO THE OSI ENVIRONMENT FOR USERS AND ALSO PROVIDES DISTRIBUTED INFORMATION SERVICES |
| PRESENTATION |
| PROVIDES INDEPENDENCE TO THE APPLICATION PROCESSES FROM DIFFERENCES IN DATA REPRESENTATION (SYNTAX) |
| SESSION |
| PROVIDES THE CONTROL STRUCTURE FOR COMMUNICATION BETWEEN APPLICATIONS; ESTABLISHES, MANAGES, AND TERMINATES CONNECTIONS (SESSIONS) BETWEEN COOPERATION APPLICATIONS |
| TRANSPORT |
| PROVIDES RELIABLE, TRANSPARENT TRANSFER OF DATA BETWEEN END POINTS; PROVIDES END TO END ERROR RECOVERY AND FLOW CONTROL |
| NETWORK |
| PROVIDES UPPER LAYERS WITH INDEPENDENCE FROM THE DATA TRANSMISSION AND SWITCHING TECHNOLOGIES USED TO CONNECT SYSTEMS; RESPONSIBLE FOR ESTABLISHING, MAINTAINING, AND TERMINATING CONNECTIONS |
| DATA LINK |
| PROVIDES FOR THE RELIABLE TRANSFER OF INFORMATION ACROSS THE PHYSICAL LINK; SENDS BLOCKS (FRAMES) WITH THE NECESSARY SYNCHRONIZATION, ERROR CONTROL, AND FLOW CONTROL |
| PHYSICAL |
| CONCERNED WITH TRANSMISSION OF UNSTRUCTURED BIT STREAM OVER PHYSICAL MEDIUM; DEALS WITH THE MECHANICAL, ELECTRICAL, FUNCTIONAL, AND PROCEDURAL CHARACTERISTICS TO ACCESS THE PHYSICAL MEDIUM |

FIG. 24

HIGH SPEED, SCALABLE, DYNAMIC INTEGRATED PROGRAMMABLE SWITCH (DIPS) DEVICE

BACKGROUND OF THE INVENTION

1. Field of the Invention

The present invention relates in general to electronic switching devices, switch fabrics and elements used in network systems and in particular to high speed scalable, dynamically programmable Tera-Bit Routing platforms.

2. Description of the Related Art

Figure 1:
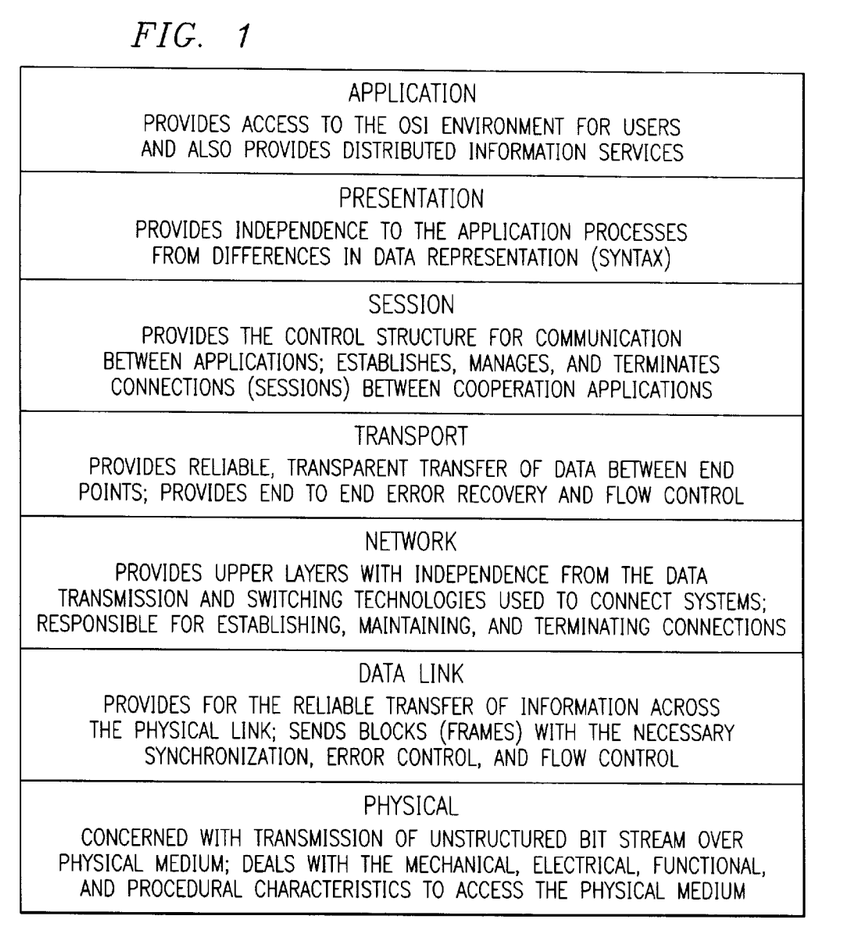
FIG. 1 is the OSI 7-Layer stack that sets the framework for developing protocol standards.
Figure 2:
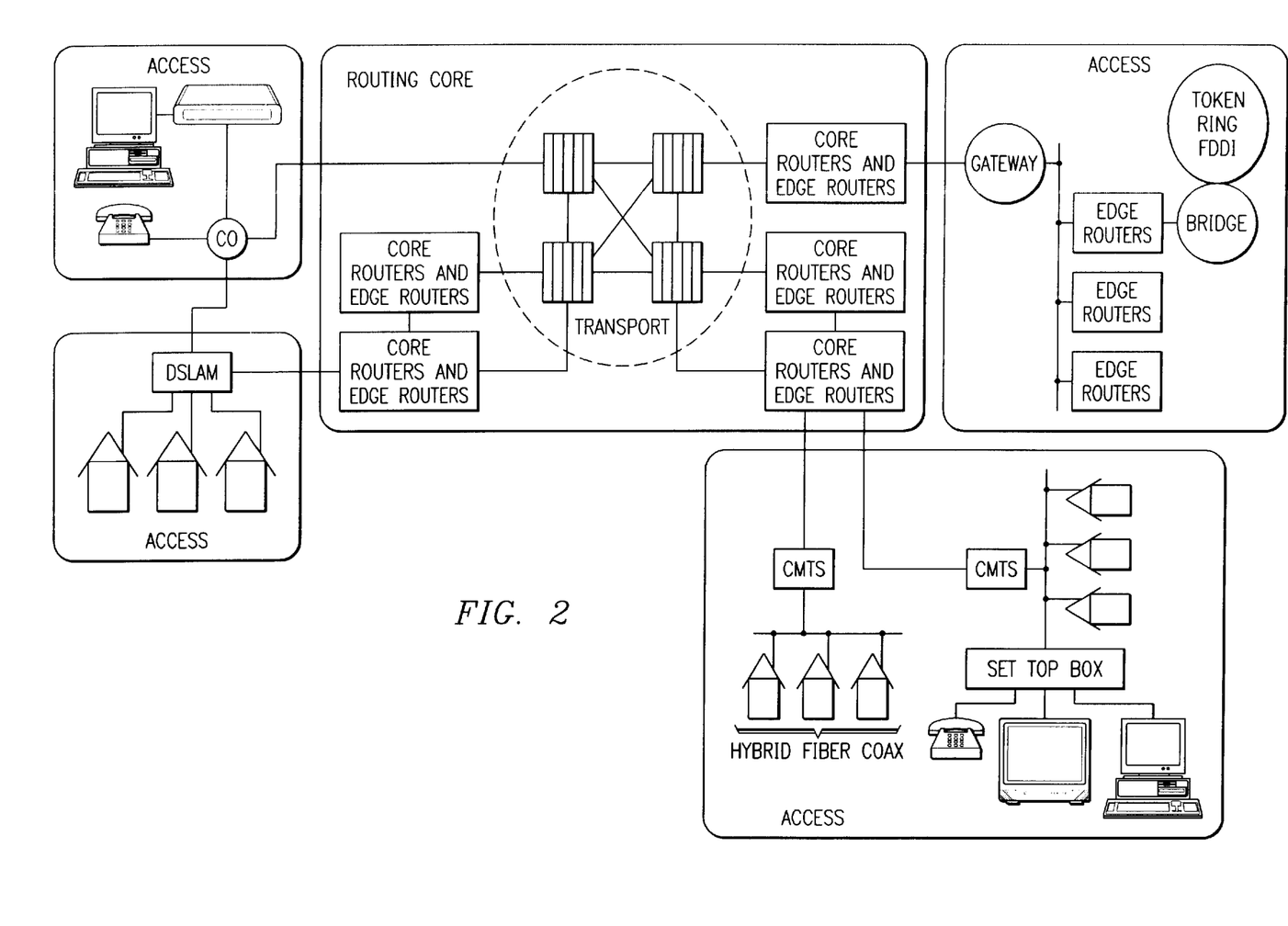
FIG. 2 is a conceptual diagram of a network that can offer multi-media services tied to different access networks.

Current networking equipment and related systems operate at various levels in the OSI 7 layer structure shown in FIG. 1. A typical network can be divided in to several sections as shown in FIG. 2. The first section or "access network" is used primarily for traffic aggregation from individual users. The second section comprises the "routing core" of the network and is used primarily for routing and a level of aggregation. The routers that form this routing core are designated as edge and core routers. The edge routers reside closer to the access network while the core routers connect multiple edge routers and sit in a centralized location closer to the backbone or the transport network.

The topology shown in FIG. 2 is by no means the only way to implement the network but is meant to establish a frame of reference for the terminology used throughout the remainder of this document. For example, the partitioning of the network into sections becomes redundant in a converged scalable network. The network topology is entirely determined by cost and design considerations including the density of the end users per square mile, the distance between the successive distribution points within the network and the limitations of the devices/elements (design parameters) within this network.

All the elements in the access portion of the network work together to provide interfaces to the data traversing the network, by encapsulating them into the lower layers on the protocol stack as shown in FIG. 1. The CPE or consumer premises equipment provides the higher layer interfaces between the end user (Layers 7 through 5) and the rest of the network (Layers 4 through 1). The physical layer is the actual transmission medium or channel through which data is carried at the "line rate." The line rate is a characteristic of the physical channel on which data rides, i.e. different channels have different material and physical characteristics that determine the rate of transmission of data on that channel. A "physical layer protocol" is used to transmit data between any two nodes in network on the physical layer. Examples of this are found in the optical networking area, SONET (which uses packets/frames), DWDM (this exploits the channel characteristics of an optical fiber to create multiple bit pipes within the fiber).

Layer 2, which is known as the data layer, carries data formatted to conform to given protocol or formats, which usually follow an open standard. For example, in a packet network, the information contained in the packets at each layer is the encapsulation or conversion (in cases where compression is used, it can not be looked as straight forward encapsulation), of the layer above it. A new header is added to each new packet that is formed from a data packet of the previous layer. This process is continued on down the stack till one reaches the actual physical layer and the packet format is conducive to physical layer transmission.

The IP and ATM protocols are Layer Three or Layer Two protocols. Thus, to understand what each element in the network is sending between any two points, one has to be able to understand what protocol is being used at each layer. This in common terminology is called terminating a certain protocol or interface, although terminating a protocol/interface can be used interchangeably. The major difference being, an ATM or an IP "interface" is a standard while an ATM/IP "protocol" is only representative of the layer at which it is being used, and is a subset of the standard.

The challenge is to utilize the available line rate to its maximum extent. In other words, the data rate is usually higher in terms of bits per second (bps) and therefore, the raw bit stream must be squeezed into the available channel, which is limited by the line rate. As mentioned above, the line rate is limited by the characteristics of the physical channel that is being used. Additionally, the actual utilization of the line rate is usually limited by the physical interface electronics, including the transceivers, which interface the PHY layer interface with a network device. The transceivers may be purely electrical or electro-optical, depending on the type of channel being used. Another factor that limits the utilization of the line rate maximum capacity is the architecture of the switching systems (DSLAMs, Routers, Switches etc.) of the core network as shown in FIG. 2.

The typical architectures of the larger switching elements and the routing elements within the network are similar to that of SMP machines (symmetric multi-processing machines). These typically consist of a system with many interface cards known as the line side interfaces and a smaller number of cards providing what is called a trunk side interface. The trunk side interface is usually of a size that is a multiple of the size of the single line side interface. All the control and the management of such a system is provided by a processing or a controller card that is typically a single board microcomputer that has been specially designed for the task. This microcomputer may have a custom processor at it's core or a standard off the shelf RISC or CISC processor. The interconnect means includes a switch matrix, and a back-plane that forms a uniform physical interface for each of the cards to tie into.

One means of increasing the bit rate through the network is to increase the throughput between each of the elements of the switching system. This can be done using novel back-plane designs, novel back-plane architectures, new switch architectures or by optimizing the utilization of the standard architectures and designs by increasing the speed and efficiency of each of the various elements. The last option is widely employed as the fundamental architecture of switches and the switching systems has not changed significantly over the last few years. Most of the changes have therefore been the result of the ability to integrate more and more functions onto singe ICs, which leads to denser switches at a lower cost and with higher speed. There also have been incremental technology improvements in the solid-state electronics producing faster transceivers and higher clock speed devices which have further aided this quest for higher bandwidth.

Several back-plane architectures have been proposed, as well as several shared memory architectures. The limitations of these inventions lie primarily in their use of lookup tables, which are limited in both size and speed. This causes problems in realizing the next generation of real-time multi-media services which feature various grades of packet traffic (CBR, VBR, UBR). This is particularly true in the case of higher-level protocols that take up more over-head in terms of translation and abstraction from the physical layer.

Another limitation of the traditional routing architectures is the limited number of data packets that can be pushed through the network at any given time. Traditional switching back-planes (active or passive) and shared memory architectures typically form a non-blocking crossbar. The throughput of these crossbar switches is generally a function of the number of input ports, the number of output ports and the clock speed of the devices or device forming the switch. The theoretical maximum capacity, or throughput, is seldom achieved in an operating environment or in a practical setting, usually due to the limitations of the controller of the switch matrix, as well as synchronization and timing delays. Moreover, systems built using prior art switching devices are generally more complex in terms of the hardware switching elements as well as control software and hardware. This disadvantageously leads to higher cost system with limited scalability.

In sum, what is needed are improved switches and switching methods for use in network applications. Among other things, these switches and methods should allow for maximization of throughput rate and the minimization of cost and complexity.

SUMMARY OF THE INVENTION

According to one embodiment of the inventive concepts, an asymmetrical switch is disclosed which includes a random access memory element, a first port selectively coupled to the memory element by a first control signal and a plurality of second ports, each independently coupled to the memory element by a corresponding one of a plurality of second control signals.

The inventive principles are also embodied in a switch which includes a first input port selectively coupled to a first storage element in response to an input enable signal and a second input port selectively coupled to a second storage element in response to an input enable signal. The switch also includes first and second output ports selectively coupled to the first and second storage elements respectively in response to a first output enable signal. Third and fourth output ports selectively couple to the first and second storage elements respectively, in response to a second output enable signal.

Another embodiment of the inventive concepts is a switch including a first plurality of input ports each selectively coupled to a first storage element in response to an input enable signal and a second plurality of input ports each selectively coupled to a second storage element in response to an input enable signal. A first output port is selectively coupled to the first storage element in response to an output enable signal and a second output port is selectively coupled to the second storage element in response to an output enable signal.

The present inventive principles, among other things, provide the building blocks for constructing and operating high speed, scalable and dynamically programmable switches and switching systems. Among the many applications of these principles, including networking systems, such as routers, hubs, switch fabrics, and physical layer devices.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

The principles of the present invention and their advantages are best understood by referring to the illustrated embodiment depicted in FIGS. 1–24 of the drawings, in which like numbers designate like parts.

Figure 3:
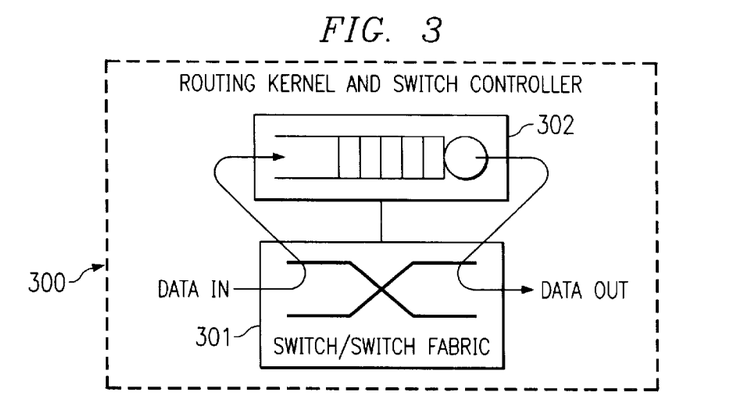
FIG. 3 is a functional block diagram of a switch showing the actual switch fabric and the control elements.

With reference to FIG. 3, a switch 300 is shown which includes an underlying protocol independent switch fabric 301 controlled by a routing kernel and software controller 302. A specific type of packet associated with a particular protocol can be handled by the loading of a specific routing kernel.

Figure 4:
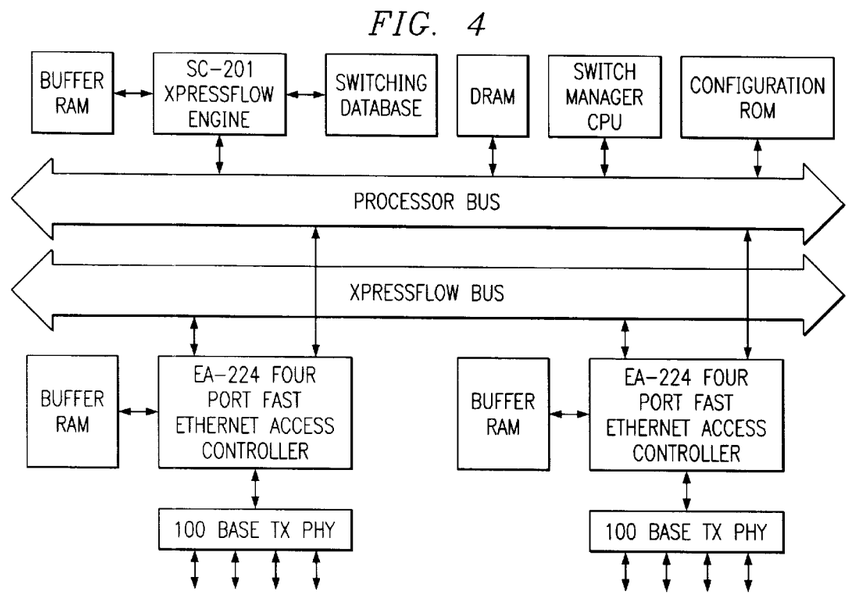
FIG. 4 is a high-level block diagram of an example EtherNet switch.

With respect to FIG. 3, switch fabric is 301 implemented or can be visualized as some form of a crossbar as shown, with N Inputs and M outputs, which can be implemented in various ways. The interface circuits that provide various line side interfaces are connected to the inputs and outputs of switch fabric 301. An example of this is IBM 8260 switch architecture, where the switch fabric is formed by a single stage crossbar IC. Line cards are connected thereto using a passive back-plane. With respect to FIG. 4 another example is shown of a fast Ethernet switch architecture. In this case the back-plane is composed of an active bus that is proprietary.

Figure 5:
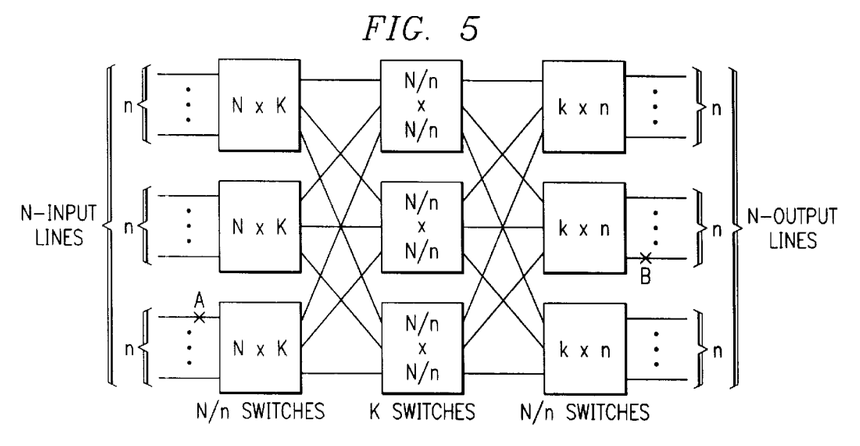
FIG. 5 is a block diagram of a three-stage, symmetrical N×N Clos switch.

With respect to FIG. 3, the crossbar can be implemented in a single stage, using a single IC or in multiple stages. A three-stage implementation is shown in FIG. 5. This particular architecture is called the Clos architecture. Current switch ICs are typically of a size 64×64, where 64 is the number of input and output ports, and the ports can be a single bit wide or multiple bits wide. In the case of the IBM 8260 switch, the single stage crossbar switch configuration is used with each port being 8 bits wide.

Figure 6:
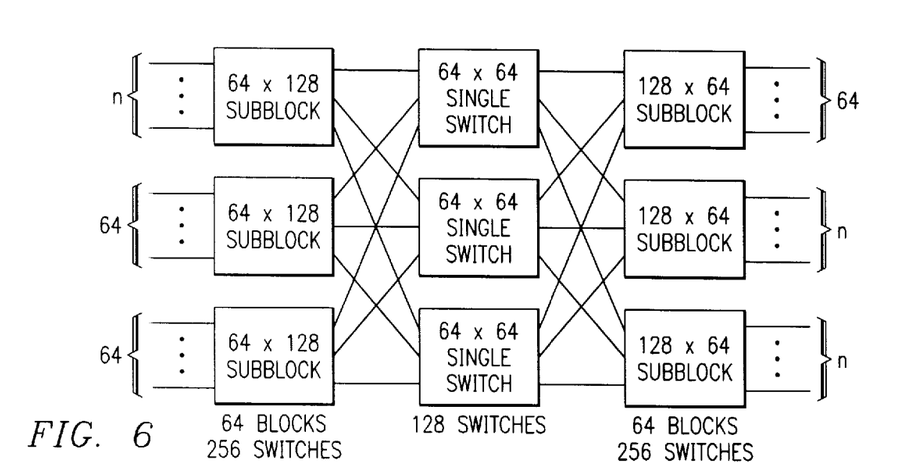
FIG. 6 is an actual design of a three stage, symmetrical, 4096 bits×4096 bits Clos switch.

An example is shown in FIG. 6 of a Clos three stage 4096×4096 (input ports×output ports) switch based on individual crossbar ICs of sizes of 32×64 (input ports×output ports) and 64×64. In particular, this configuration requires 256 switch ASIC of size 32×64 in the input stage, 128 switch ASIC of size 64×64 in the center stage and 256 switch ASIC of the size 64×32 in the output stage. All the ASIC chips have input and output ports that are a bit wide. The total number of switch ASICs required to build a non-blocking switch with 4096 input ports and 4096 output ports, each port being 1 bit wide, is 640.

As reference 2 shows that the total number of cross points in a three-stage Clos switch fabric is: Cross points=2kN+k*(N/n)² where the input stages are made of n×k switch ASIC, the output stage is made of k×n switch ASIC and the center stage is made of k×k switch ASIC.

Figure 7:
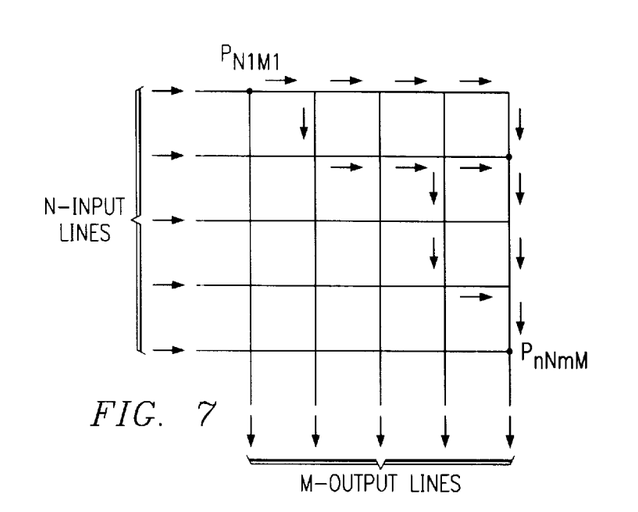
FIG. 7 is a conceptual block diagram of an N×M crossbar switch.

With reference to FIG. 7 a crossbar switch fabric of the size N×M can only have a physical structure where the row data paths are always perpendicular to each other. This means that any cross point in the middle of the fabric is connected to four other cross points by straight lines even though it is surrounded by eight cross points. That implies that the actual physical path from a point $P_{n1m1}$ to point $P_{nNmM}$ is always composed of successive x-axis traversals and y-axis traversals when viewed in the xy reference frame. Thus, there are restrictions by the physical architecture on the addressing schemes and switch mapping, as well as control of the fabric, to rectangular and linear encoding decoding schemes. This also means that, even though a fully connected graph can be theoretically formed with the N×M vertexes or cross points, a practical N×M switch is not possible, given the physical limitations. The perpendicular interconnection of the inputs to the outputs in planar structure as described in prior art and familiar to those of ordinary skill in the art does not allow for implementing higher density switches than N×M with elements that are less in number than M or N.

Figure 8:
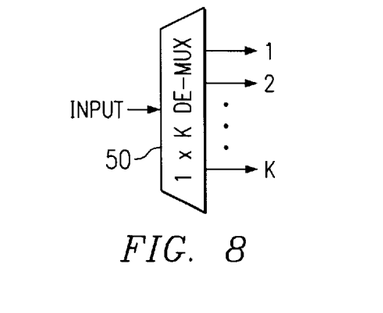
FIG. 8 is a logical functional block diagram of a broadcast switch element (BSE)
Figure 9:
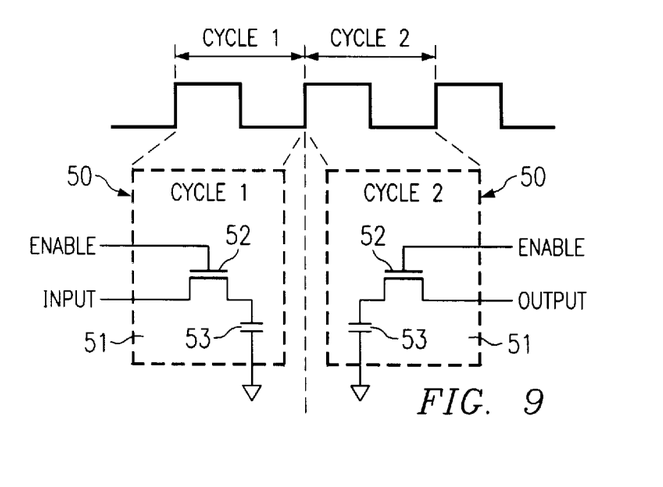
FIG. 9 is a logical block diagram of a BSE formed with a 1T1C element.

With reference to FIG. 8 a broadcast switch element, BSE (50) is defined by logical de-multiplexer of a size 1×K. With respect to FIG. 9 this switch element (50) can be implemented by an element that has a 1T1C structure (51) that has one gate transistor (52) (input/output port) and one storage capacitor (53). In this configuration K=1. An asymmetrical structure with K>1 can also be implemented using the 1T1C (51).

Figure 10:
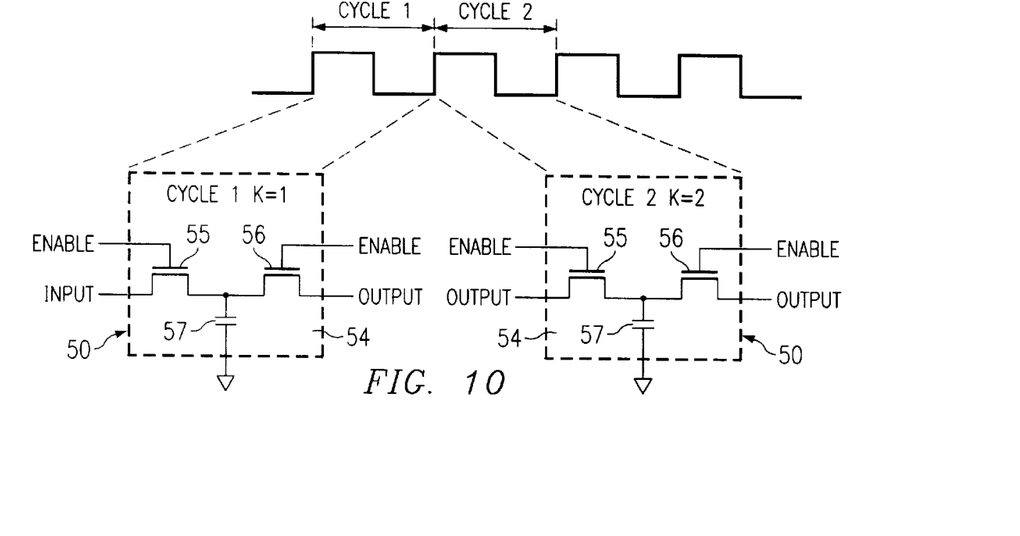
FIG. 10 is a logical block diagram of a BSE formed with a 2T1C element.

With respect to FIG. 10, the broadcast switch element, BSE (50) can be implemented by 2T1C structure (54) that has two input/output port gate transistors (55), (56) and one storage capacitor (57). In this configuration K=1 for an unidirectional 2T1C element, and K=2 for bidirectional 2T1C in the switch element. A structure that is asymmetrical with K>2 can also be implemented using the 2T1C (54).

Figure 11A:
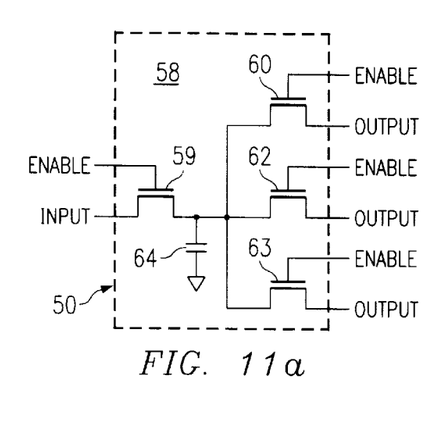
FIG. 11a is a circuitry diagram of a BSE formed with a 4T1C element.
Figure 11B:
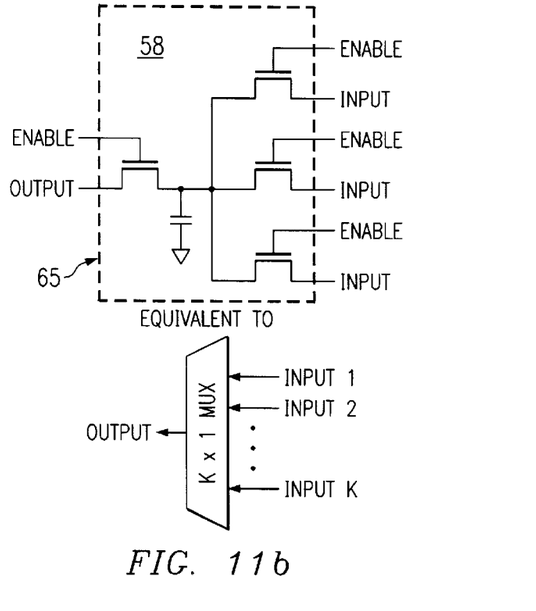
FIG. 11b is a circuit diagram of a receive switch element (RSE) formed with a 4T1C element.

With respect to FIG. 11a, the BSE(50) can be implemented by a 4T1C structure (58) that has one input port gate transistor (59), three output port gate transistors (60), (62), (63) and one storage capacitor (64). In this configuration K=3. If this element is used in the reverse fashion it forms a multiplexer of the size K×1 which can also be viewed as a receive switch element, RSE (65).

Larger asymmetric/symmetric elements can be used to implement the BSE (50) or the receive switch element (65). The number of input and output port gates is determined by the size of the storage capacitor element (52). A larger value of the storage capacitor (53), (57) or (64), can be formed with several parallel capacitors. This however will induce delays in reading and writing the data from and to the switch element.

Figure 12A:
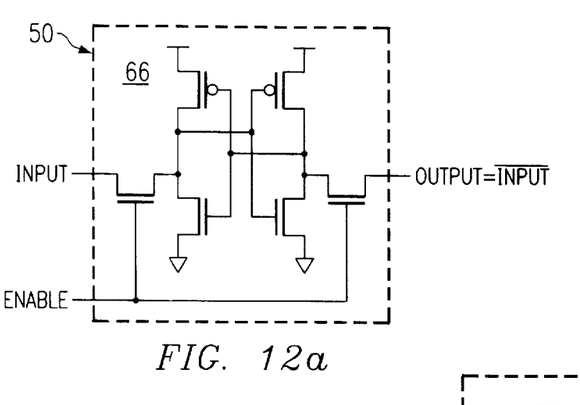
FIG. 12 is a logical representation (or Block diagram) of a BSE implemented with SRAM elements.
Figure 12B:
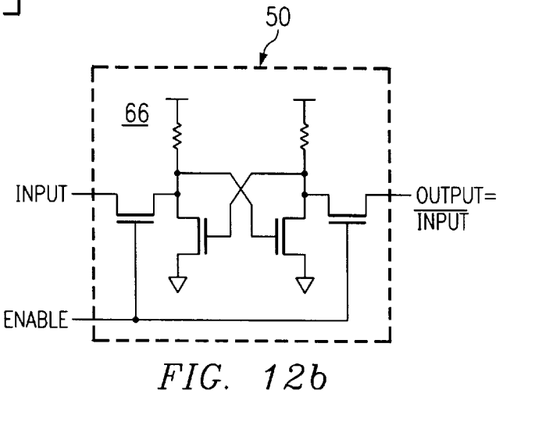
Figure 13:
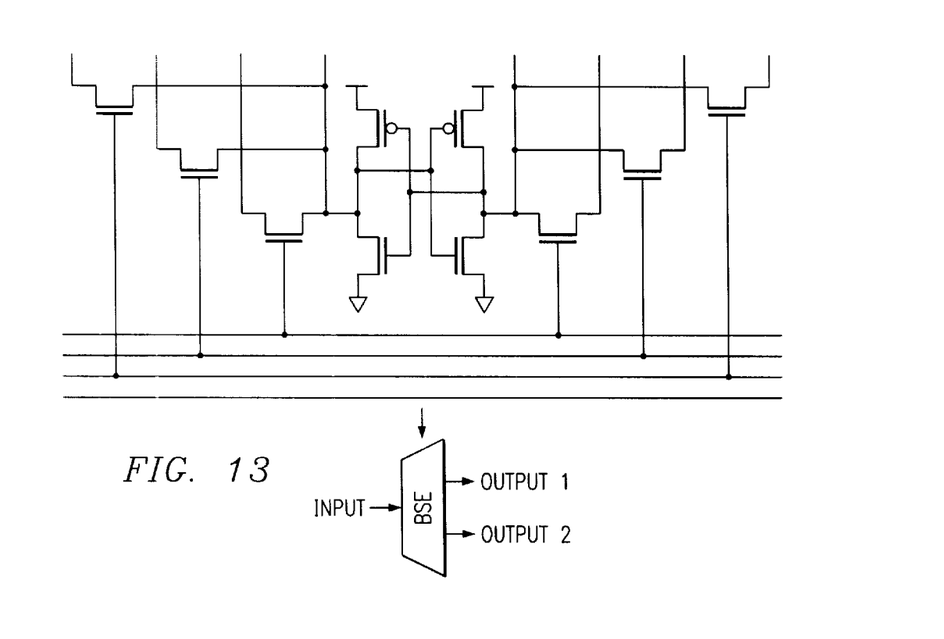
FIG. 13 illustrates a BSE formed with a dual ported SRAM element.

In a similar fashion a static storage element can be used to form the BSE (50). With respect to FIG. 12 a single bit static storage element (66) is used to form the switch element, in this case K=1. The same applies for a dual ported static element as shown, with respect to FIG. 13 where a dual ported static storage element (67) is used with K=2 or K=1 based on how the BSE is used within the DIPS device (bi-directional or uni-directional). An asymmetric static storage element can be used to achieve the same results to implement the 1×K BSE (50) or a RSE (65).

Prior art exists on simple switches where the 1T1C forms a switch element with K=1. In this case the gate transistor (52), with respect to FIG. 9 forms both the input and output port for the switch. This will be familiar to those of ordinary skill in the art as the Shared Memory Switch. That means that data can be read once it is written into the element. The basic element is the building block of a DRAM. The device looks very similar to a standard DRAM with slight modifications. There are several issues that are associated with this architecture, including the latency between read/write cycles, the pre-charge latency of the basic element etc.

Figure 14:
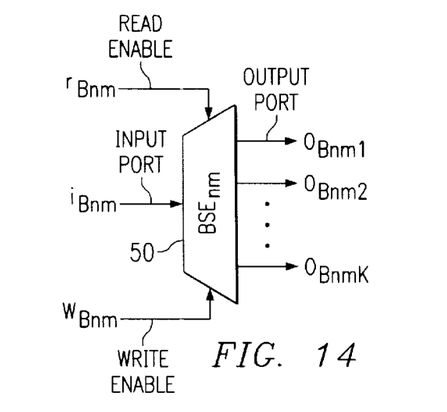
FIG. 14 BSE with Inputs and outputs labeled.

With reference to FIG. 14, the input and output ports of the BSE (50) can formally be defined as follows:

Element number=$BSE_{nm}$ where m=Column Number and n=Row number;

Input Port=$i_{Bnm}$, where $i_{B11}$ is the input port of element in row 1 and column 1;

Output Port=$o_{BnmK}$, where $o_{B111}$ is the output port 1 of element in row 1 and column 1;

Read Enable=$r_{Bnm}$, where $r_{Bnm}$ is a signal that allows access to storage through the output port, $O_{BnmK}$, of BSE (50), $BSE_{nm}$ within the DIPS device (69). The Read enable line has a width of bits=$\log_2 K$ where K is the number of output ports in the BSE of size 1×K; and Write Enable=$w_{Bnm}$, where $W_{BNM}$ is a signal that allows access to storage through the input port, $i_{Bnm}$, of BSE (50), $BSE_{nm}$, within the DIPS device (69). The Write enable line has a width of bits=1 in the structure of the BSE shown in FIG. 14.

(The above definitions may be changed without altering the nature of the invention.)

Figure 15:
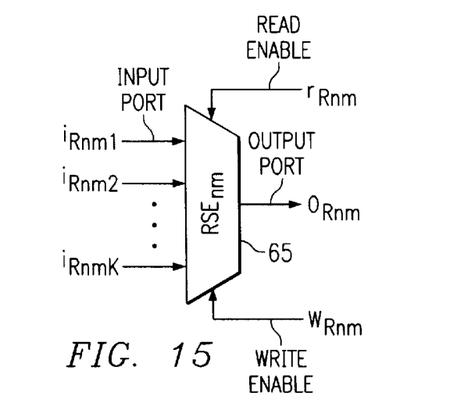
FIG. 15 RSE with Inputs and outputs labeled.

With reference to FIG. 15, a similar naming convention can be used to define the input and output ports of a RSE (65) as follows:

Element number=$RSE_{nm}$ where m=Column Number and n=Row number;

Input Port=$i_{RnmK}$, where $i_{R111}$ is input port 1 of element in row 1 and column 1;

Output Port=$o_{Rnm}$, where $O_{R11}$ is the input port of element in row 1 and column 1;

Read Enable=$r_{Rnm}$, where $r_{Rnm}$ is a signal that allows access to storage through the output port, $o_{Bnm}$, of RSE (65), $RSE_{nm}$ within the DIPS device (69). The Read enable line has a width of bits=1 in the structure of RSE shown in FIG. 15.

Write Enable=$w_{Rnm}$, where $w_{Rnm}$ is a signal that allows access to storage through the input port, $i_{BnmK}$, of RSE (65), $RSE_{nm}$, within the DIPS device (69). The Write enable line has a width of bits==$Log_2 K$ where K is the number of output ports in the RSE of size K×1.

(The above definitions may be changed without altering the nature of the invention.)

In this embodiment, switch elements BSE (50) and RSE (65) are uni-directional and asymmetric, but they can be made bi-directional and symmetric by the use of the basic building blocks or elements (51), (54), (58), (66) or (67). In the case of bi-directional elements with more than one input/output gate, the control of the switch element and the DIPS device (69) as a whole becomes more complex, although the operational principles remain the same. It is also possible to make the switch elements (50) and (65) bi-directional and asymmetric.

Figure 16A:
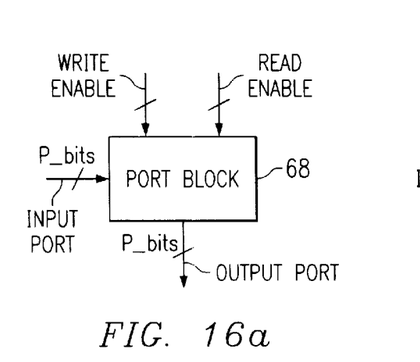
FIG. 16a illustrates a conceptual block diagram of a port block.
Figure 16B:
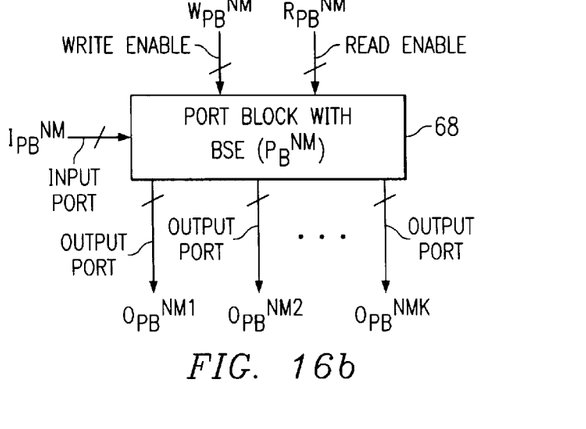
FIG. 16b illustrates functional block diagram of a port block formed using BSEs.

With respect to FIG. 16 a port block (68) is defined that consists of multiple switch elements of the type RSE of BSE. The size of the port block is P bits. This requires the usage of a multiple of P number of RSE or BSE switch elements to create a port block P bits wide. Each of these RSE and BSE can be created with basic elements of the type (51), (54), (58), (66) or (67), that are asymmetric/symmetric, bi-directional, uni-directional or any combination thereof.

With reference to FIG. 16, the interfaces to the port block (68), of size P bits that is formed with P BSEs, are defined as:

Port Block number=$P_B^{NM}$, where N=row number and M=column number;

Input port=$I_{PB}^{NM}$, where $PB^{NM}$ indicates a unique port block with a row and column address in a two dimensional matrix of size N×M. The input port, $I_{PB}^{NM}$ is P bits wide;

Output port=$O_{PB}^{NMK}$, where $PB^{NM}$ indicates a unique port block with a row and column address and K indicates the output port number of the unique port block. The output port, $O_{PB}^{NMK}$, is also P bits wide;

Read Enable=$R_{PB}^{NM}$, is P×width $r_{Bnm}$ bits wide where, width of $r_{Bnm}$=$Log_2 K$ where K is the number of output ports in the BSE of size 1×K; and Write Enable=$W_{PB}^{NM}$, is P bits wide since P number of BSEs of the size 1×K, as shown in FIG. 14, are used.

The above definitions may be changed without altering the nature of the invention.

Figure 17:
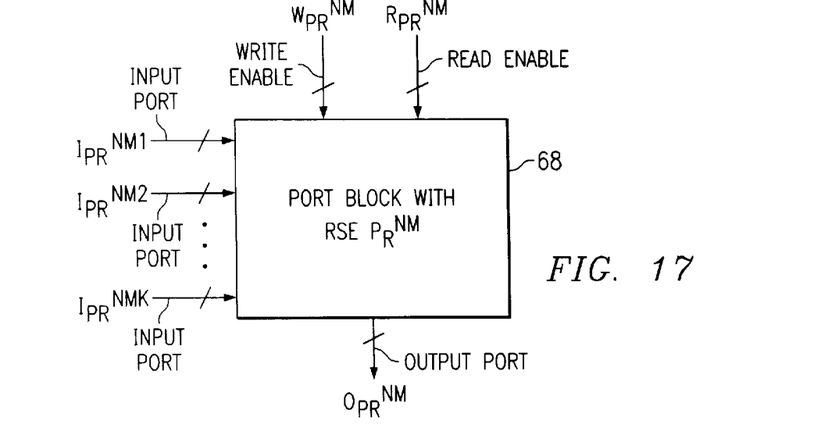
FIG. 17 is a functional block diagram of a port block formed using RSEs.

With reference to FIG. 17, the interfaces to the port block (68), of size P bits that is formed with P RSEs, are defined as:

Port Block number=$P_R^{NM}$, where n=row number and m=column number

Input port=$I_{PR}^{NMK}$, where Pnm indicates a unique port block with a row and column address. The input port, $I_{PR}^{NM}$, is P bits wide.

Output port=$O_{PR}^{NM}$, where $PR^{NM}$ indicates a unique port block with a row and column address and K indicates the output port number of the unique port block. The output port, $O_{PR}^{NM}$, is also P bits wide.

Read Enable=$R_{PR}^{NM}$, is P bits wide since P RSE of size K×1, as shown in FIG. 15, are used.

Write Enable=$W_{PR}^{NM}$, is P×width of $w_{Rnm}$ bits wide where, $w_{Rnm}$=$Log_2 K$ where K is the number of output ports in the RSE, as shown in FIG. 15, of size K×1.

The above definitions may be changed without altering the nature of the invention. For the use of Read and write enables which are less than P bits wide a decode circuit needs to included in the write and read stages of each port block.

Figure 18A:
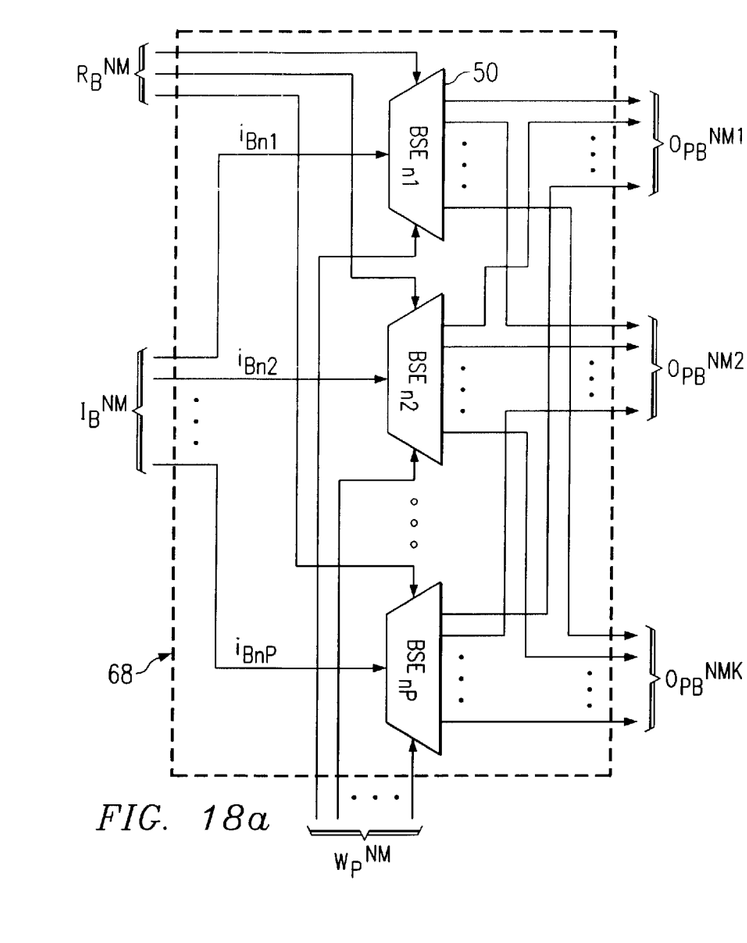
FIG. 18a is the logical architecture of a port block implemented using BSE.
Figure 18B:
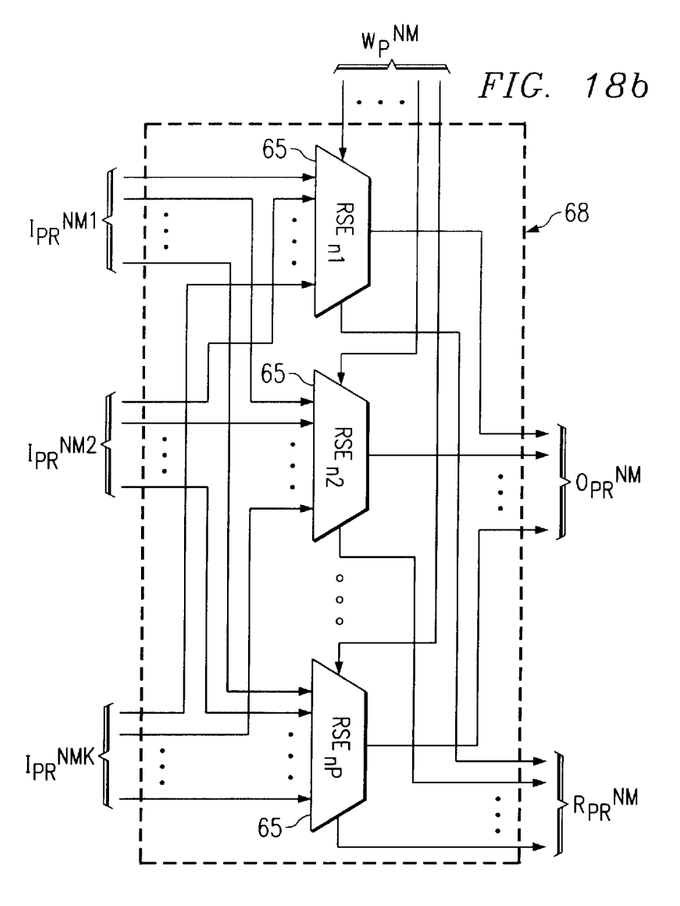
FIG. 18b is the logical architecture of a port block implemented using an RSE.

With reference to FIGS. 18a,b, a port block (68) constructed from a set of BSEs, has the one dimensional architecture shown. It is possible to implement two dimensional port blocks of a larger size than P with a flexible interconnections of the BSE within the same port block in a two dimensional matrix. The input port $I_B^{NM}$ of the port block is formed by all the input ports of the individual BSE taken together, where the width of P bits for the input port, $I_{PB}^{NM}$, is due to the combined width of the each of the input ports, $i_{BNM}$ of the P number of BSEs taken together. Each of the K output ports, of the port block, $O_{PB}^{NMK}$, of width P, are formed by combining the same output port, $O_{BnmK}$, of each BSE in the same port block. This means that the output port 1 ($O_{B111}$) of BSE 1 ($BSE_{11}$) of port block 1 ($P_B^{11}$) is combined with the output port 1 ($O_{B111}$) of BSE 2 ($BSE_{12}$) of port block 1 ($P_B^{11}$) and so on to the output port 1 of BSE P ($BSE_{1P}$) of port block 1 ($P_B^{11}$).

Figure 19:
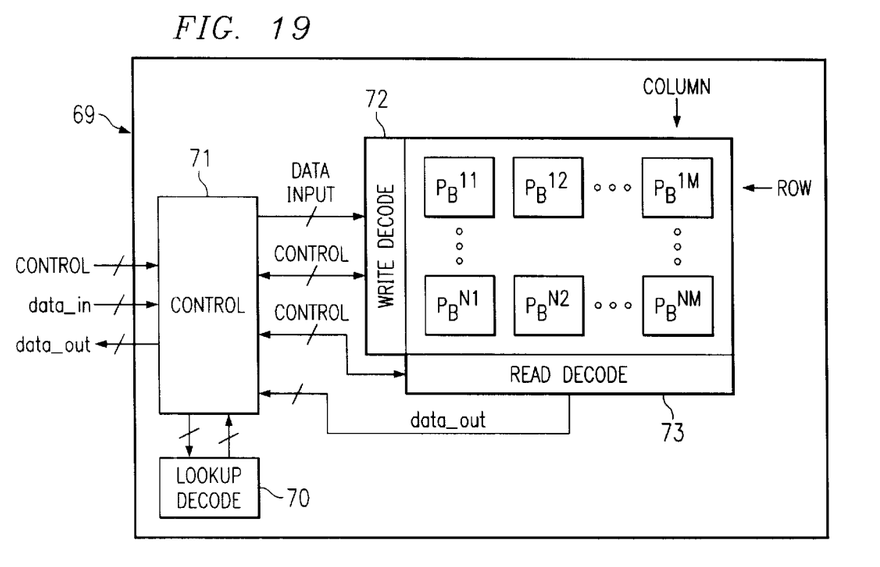
FIG. 19 general functional architecture of a DIPS device.

Having defined the architecture of the individual port block composed of BSE, with reference to FIG. 19, an embodiment of the DIPS device (69) composed of port blocks of the BSE type, in a two dimensional matrix is shown. The DIPS device (69) consists of individual port blocks (68) arranged in a row and column format (matrix), with N rows and M columns. There is single port block at the intersection of a row and column. In a DIPS device of size N×M, there are N rows of M port blocks each to give a total of NM port blocks. It is possible to put multiple port blocks at the intersection based on the physical constraints like device and element density as well as the semiconductor process parameters used to manufacture the DIPS device and, last but not least, the design objectives.

DIPS device (69) has a unidirectional input data path (Data_in) that is a multiple of P bits wide. DIPS device (69) also has a unidirectional output data path (Data_out) that is a multiple of P bits wide. There is a control bus that is used to send address information to the device as well as enable device operation with other status and control functions.

Internally there is an address lookup decode block (70), a control block (71), write decode (72), read decode (73).

Figure 20:
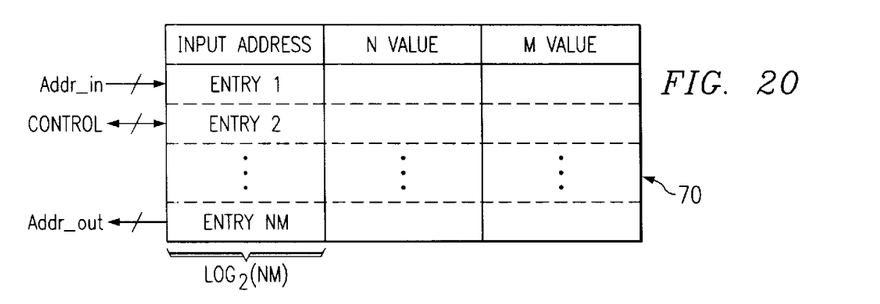
FIG. 20 illustrates the logical architecture of the lookup decode block.

The logical structure of the lookup decode block (70) is shown in FIG. 20. The lookup decode block can be formed from either dynamic or static memory elements. When an input in the form of an external address is presented to the lookup decode block it returns a physical address of the port block, in terms of N and M co-ordinates. Each column of the look up decode block will contain NM rows each of the size $Log_2(NM)$ bits.

The function of the lookup decode block (70) is to maintain a translation table of addresses sent to the device, which can be vector addresses that are derived from some other external input to the switching system, such as an IP address, to the actual physical addresses within the device. One of the possible addressing methods as mentioned is a vectored address. The address of a coordinate on the diagonal of a square matrix, of size NM, can be stored in the external system/switch controller, that maps to the actual NM. Thus this reduces the number of address bits/cycles required to generate a unique N and a unique M. This is so because in a square matrix only one co-ordinate is required to specify a unique point on the diagonal. This address translation and control implemented in software loaded on to an external controller, or the router/switch controller shown in FIG. 3.

Figure 21:
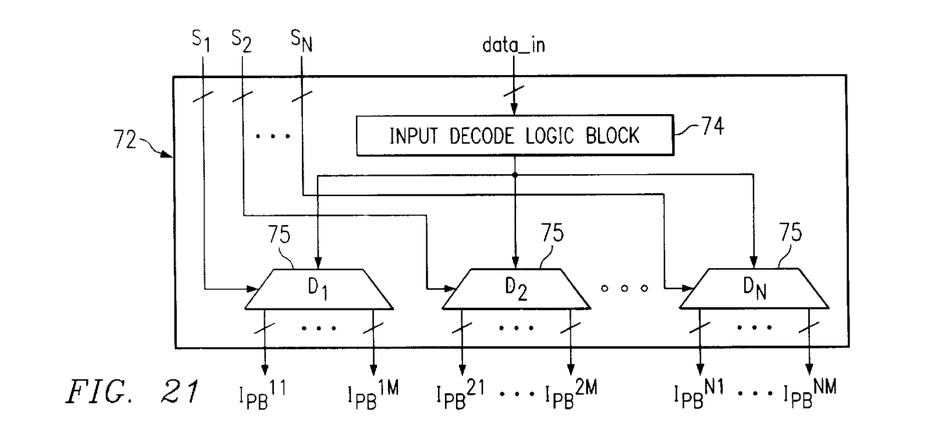
FIG. 21 illustrates the logical architectural block diagram of the write decode block.

With respect to FIG. 21a, the write decode block (73) is composed of: input decode logic block (74), N de-multiplexers (75) with M outputs each, designated by $D_N$ (1×M). The write decode block has a single p-bit wide input, data__in. It has NM outputs that are connected to the inputs $I_{PB}^{NM}$, of specific port blocks $P_B^{NM}$, within the N×M matrix of the DIPS device. There are N inputs, select lines, $S_1$ through $S_N$, select the appropriate $I_{PB}^{NM}$ based on the value of each of the $S_1$ through $S_N$ using each of the de-multiplexers $D_N$. With respect to FIG. 19, in a DIPS, since there are M port blocks in a row, the width of each of $S_0$ through $S_N$ should allow a 1 of M select, where each de-multiplexer for the N rows will have M outputs. In the illustrated embodiment, Width of each of $S_0$ through $S_N = \{\text{Log}(M)/\text{Log}(2)\}$.

With reference to FIG. 21b the structure of the input decode logic block implements a linear decode, where each $S_N$ corresponds to each de-multiplexer $D_N$, in which case the complexity of the controller increases and the flexibility of addressing the port blocks within the DIPS decreases.

The logical de-multiplexers $D_N$ (75) are preferably implemented by standard combinatorial logic and rather elements (51), (54), (58), (66) or (67). The inputs to the write decode block are the corresponding select lines, $S_1$ through $S_N$, for the de-multiplexers $D_N$ (75), for the appropriate row. In the case of a N×M DIPS device, composed of port blocks made of BSEs, there will be N input de-multiplexers $D_N$ (75) in the write decode block.

With reference to FIG. 21, each of the N input de-multiplexers $D_N$, will connect to the inputs of all the port blocks in a single row. The inputs to each of $D_N$ are labeled $I_{PB}^N$, thus a unique $I_{PB}^N$ will connect to a set of M $I_{PB}^{NM}$ in the preferred embodiment. This effectively allows for a 1 of M×N decode.

If the size of the write decode becomes too large it can be broken down into multiple sections with each section handling a set of rows.

Figure 22:
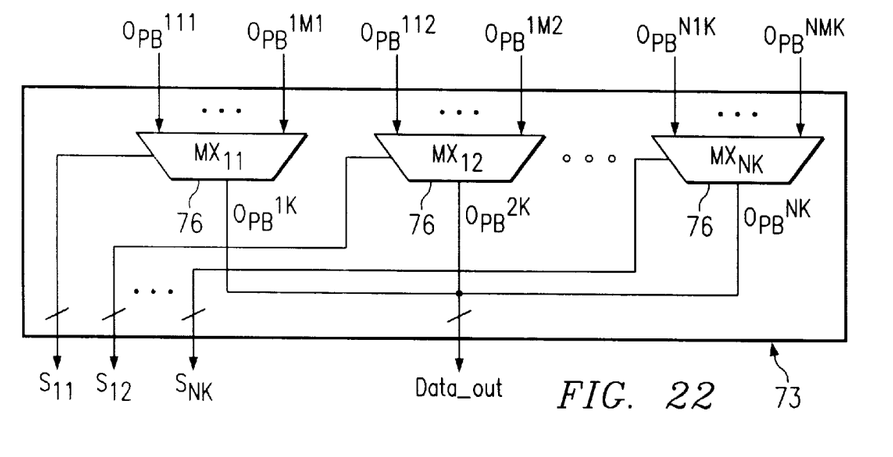
FIG. 22 illustrates illustrates the logical architectural block diagram of a read decode block when dynamic BSE elements are used.
Figure 23:
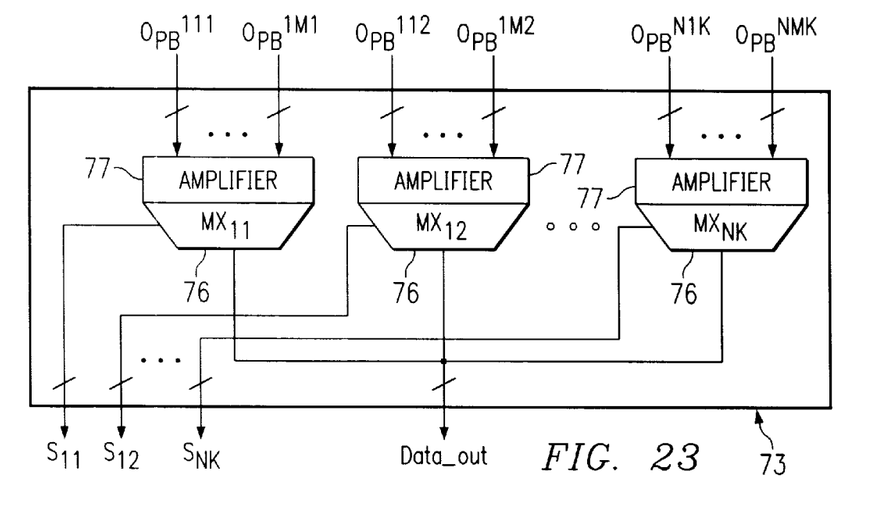
FIG. 23 illustrates the condition if the BSE that form the port blocks are made of dynamic elements of the form (51), (54), (58), then the read decode will also include the amplifier block (77), that contains sense amplifiers which can follow an open or folded type architecture

The read decode (73) has the structure shown in FIG. 22. It has MNK inputs $O_{PB}^{NMK}$, that are the output ports of each of the port blocks in each of the N rows in an N×M DIPS device. Thus the inputs to the read decode are all the outputs $O_{PB}^{NMK}$ of the NM port blocks in the DIPS device. The output of the read decode is the data__out unidirectional bus that is P bits wide. There are NK multiplexers (76) $MX_{NK}$, of size M×1, in the read decode because there are K outputs for each of the port blocks that gives rise to K multiplexers for each row. Since there are M port blocks in a row, each multiplexer has to be of size M×1. There are N rows for each DIPS (69), as shown in FIG. 23. The inputs to each of the NK multiplexers are the outputs from the individual port blocks, $O_{PB}^{NMK}$. The outputs of each of the multiplexers are M of these inputs multiplexed together are named $O_{PB}^{NK}$. This effectively implements a 1 of M×NK decode.

There are NK inputs to the read decode (73), namely select lines, $S_{11}$ through $S_{NK}$, which allow the selection of the unique output, $O_{PB}^{NMK}$ of the specific port block, $P_B^{NM}$ in the N×M DIPS device. The width of each of the select lines, $S_{11}$ through $S_{NK}$, allow a 1 of M selection. In the preferred embodiment there are M port blocks per row with K outputs each, this gives rise to K multiplexers of size M×1 per row. Width of each of $S_{11}$ through $S_{NK} = \{\text{Log}(K)/\text{Log}(2)\}$.

With respect to FIG. 23b, if the BSE that form the port blocks are made of dynamic elements of the form (51), (54), (58), then the read decode will also include the amplifier block (77), that contains sense amplifiers which can follow an open or folded type architecture.

The control block (71) receives the incoming address from the external controller and a read or write request. This information is then translated in conjunction with the lookup decode to an appropriate N co-ordinate and an M co-ordinate of the port block, to identify a unique port block to execute the read or write function. The appropriate read decode signals or the write decode signals for the corresponding port block are asserted. Thus the function of the controller block can be summarized as asserting the correct read or write enables signals. The number of write enables in an N×M DIPS device will be equal to NM with the write enable for each port block being designated by $W_{PB}^{NM}$. To select the appropriate port block, a unique combination of N, M from the lookup decode is used to select the correct input port, $I_{PB}^{NM}$ of a unique port block, $P_B^{NM}$, in the case of a write. In conjunction with this, the appropriate control signal for the row-demux element is asserted to write decode. If a read is being performed from a specific port then in conjunction with the lookup decode the signal for the appropriate row-mux element is asserted to the read decode.

In the preferred embodiment, N, M×K switches are used in each device having a switch array of the size N×M, where N is the number of rows and M is the number of columns and NM is the number of port blocks. Thus larger switch fabrics can be created by cascading individual DIPS together in any architecture that is found in prior art in single and multiple stage configurations.

Figure 24:
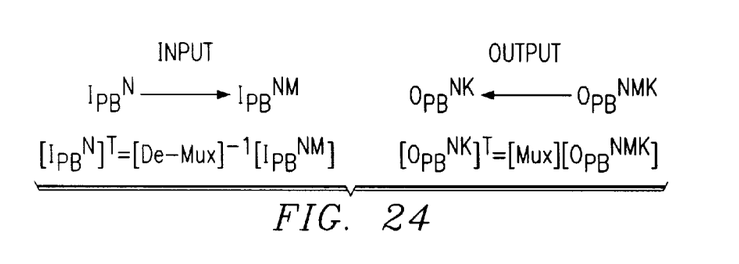
FIG. 24 illustrates the general model equations that describe the logical architecture of a DIPS device.

Other embodiments are possible of the DIPS device by finding the solutions to the equations shown in FIG. 24 which indicate the logical interconnection or the architecture of the DIPS. This logical interconnection can be dynamically changed based on a specific solution of the equations. If the MAP of the inputs to the outputs is maintained by an external switch controller or kernel as shown in FIGURE To design a DIPS switch array of a required size to implement a mix of switches of various sizes one has to effectively optimize the following equations:

1) Input to Input Port map $$[I_{PB}^N]^T = [\text{Transform}][I_{PB}^{NM}]$$

Where

[$I_{PB}^N$] = N×1 Tensor

[$I_{PB}^{NM}$] = N×M matrix (All the inputs of the N×M port block array)

[Transform] = Any logical operation that allows one to form a Graph composed of the logical interconnections of all the $I_{PB}^{NM}$. In this embodiment, the transform is the Boolean operation of de-multiplexing.

2) Output Port to Output map $$[O_{PB}^{NK}]^T = [\text{Transform}][O_{PB}^{NMK}]$$

Where

[$O_{PB}^{NK}$]=NK×1 Tensor

[$O_{PB}^{NMK}$]=NK×M matrix (All the outputs of the N×M port block array)

[Transform]=Any logical operation that allows one to form a graph composed of all the logical interconnections of all the $O_{PB}^{NMK}$. In this embodiment the transform used is the Boolean operation of multiplexing.

DIPS device composed entirely of RSE can be made by changing the transformation in equation 1 to a multiplexer, with the appropriate changes in variables, and a change in the transformation in equation 2 to a de-multiplexer, with the corresponding appropriate change in variables.

Various switch architectures can be implemented, such as a butterfly switch array within the DIPS device by using a mix of BSE and RSE port blocks. To implement different switching architectures with DIPS devices of the BSE and RSE type one can employ a mix to construct the desired network/architecture of the switch fabric.

While a particular embodiment of the invention has been shown and described, it will be obvious to those skilled in the art that changes and modifications may be made therein without departing from the invention in it's broader aspects, and, therefore, the aim in the appended claims is to cover all such changes and modifications as fall within the true spirit and the scope of the invention.

Although the invention has been described with reference to a specific embodiments, these descriptions are not meant to be construed in a limiting sense. Various modifications of the disclosed embodiments, as well as alternative embodiments of the invention will become apparent to persons skilled in the art upon reference to the description of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore, contemplated that the claims will cover any such modifications or embodiments that fall within the true scope of the invention.

What is claimed:

1. An asymmetrical receive switching element comprising:
    a random access memory element,
    an output data port selectively coupled to the memory element through an output pass transistor by an output enable signal;
    a plurality of input data ports each independently coupled to the memory element through an input pass transistor by a corresponding one of a plurality of input enable signals; and
    wherein the memory element comprises a capacitor having first and second plates, the first and second input data ports coupled to the first plate through the pass transistors.

2. The asymmetrical switching element of claim 1 wherein the first and second input ports are synchronously accessible.

3. The asymmetrical switching element of claim 1 wherein the first and second input ports are asynchronously accessible.

4. An asymmetrical receive switching element comprising:
    a random access memory element,
    an output data port selectively coupled to the memory element through an output pass transistor by an output enable signal;
    a plurality of input data ports each independently coupled to the memory element through an input pass transistor by a corresponding one of a plurality of input enable signals; and
    wherein the memory element comprises a static random access memory cell having first and second latching nodes, the first input port coupled to the first latching node and the second input ports coupled to the second latching node through the pass transistors.

5. The asymmetrical switching element of claim 4 wherein the first and second input ports are synchronously accessible.

6. The asymmetrical switching element of claim 4 wherein the first and second input ports are asynchronously accessible.

7. A switch comprising:
    a first plurality of input ports each selectively coupled to a first storage element through a pass transistor in response to an input enable signal;
    a second plurality of input ports each selectively coupled to a second storage element through a pass transistor in response to an input enable signal;
    a first output port selectively coupled to said first storage element through a pass transistor in response to an output enable signal;
    a second output port selectively coupled to said second storage element through a pass transistor in response to an output enable signal, and
    wherein said first and second storage elements comprise dynamic random access memory cells.

8. The switch of claim 7 wherein said first output port is selectively coupled to said first storage element in response to a first output enable signal and said second output port is selectively coupled to said second storage element in response to a second output enable signal.

9. The switch of claim 7 wherein a selected one of said first plurality of input ports is coupled to said first storage element and a selected one of said second plurality of input ports is coupled to said second storage element in response to a single selected input enable signal.

10. The switch of claim 7 wherein said first and second output ports are selectively coupled to the first and second storage elements in response to a single output enable signal.

11. The switch of claim 7 wherein said first and second storage elements comprise static random access memory cells.

* * * * *